INVENTORS
Walter Shultz
Harmon Langdon

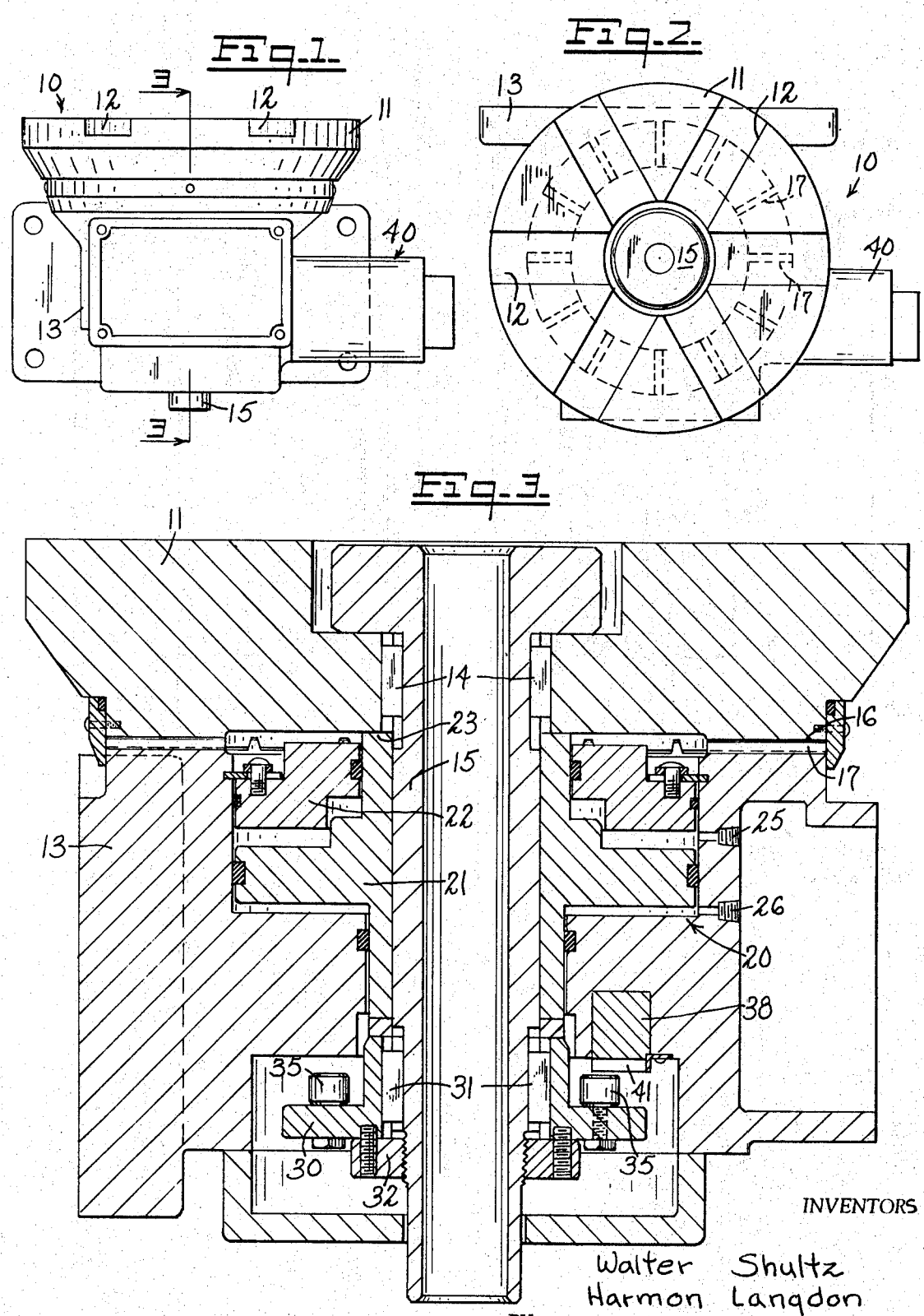

BY DeLio and Montgomery
ATTORNEYS great# United States Patent Office 3,545,317
Patented Dec. 8, 1970

3,545,317
TURRET INDEXING MECHANISM
Walter Shultz, Newport, N.H., and Harmon Langdon, Springfield, Vt., assignors to Textron, Inc., Providence, R.I., a corporation of Rhode Island
Filed Dec. 4, 1967, Ser. No. 687,694
Int. Cl. B23b 29/32
U.S. Cl. 82—36                    3 Claims

ABSTRACT OF THE DISCLOSURE

This invention is directed to a mechanism for positioning a tool carrier of a turret lathe. In the preferred embodiment the invention comprises a base, a tool holder, tooth face coupling means on both the base and the tool holder, and means forming a portion of the base for raising and lowering the tool holder to separate and to cause engagement of said tooth face coupling means on both said tool holder and said base and, in addition, means for rotating said tool holder to index the mechanism during the period of time that the mating tooth face coupling means of said base and said tool holder are separated.

---

The invention relates to a new and improved mechanism for indexing tool carriers of a turret lathe.

There are many types of indexing and locating mechanisms disclosed in the prior art for positioning a tool carrier of a turret lathe. Although the prior art has provided many sophisticated but expensive indexing mechanisms, as well as many economical but inaccurate mechanisms, there has been a great deal of difficulty in providing an economical, accurate, as well as highly reliable indexing mechanism.

In view of the foregoing, applicant has invented a new and improved tool carrying mechanism which is economical to produce and which, because of its construction, is highly accurate. Additionally, because of the small number of moving parts, the indexing mechanism of this invention is highly reliable and has a long operating life-time before replacement or repair is required.

Accordingly, it is an object of this invention to provide a new and improved indexing mechanism for positioning a tool holder on a turret lathe.

Another object of this invention is to provide a new and improved indexing mechanism which is highly accurate, economical to construct and has a high degree of reliability.

A further object of this invention is to provide a new and improved indexing mechanism for a tool holder which, because of its construction, may be used for long periods of time with a minimum service requirement for maintaining the mechanism in operating condition.

Still other objects and advantages of the invention will in part be obvious and will in part appear hereinafter.

In accordance with this invention, there is provided an indexing mechanism which, in the preferred embodiment, comprises a base, a tool holder, tooth face coupling means on both the base and the tool holder, and means forming a portion of the base for raising and lowering the tool holder to separate and to cause engagement of said tooth face coupling means on both said tool holder and said base. Also, means for rotating said tool holder are provided to index the mechanism during the period of time that the mating tooth face coupling means of said base and said tool holder are separated.

The invention accordingly comprises the apparatus possessing the features, properties and relation of elements which will be exemplified in the apparatus hereinafter described and the scope of the invention will be indicated in the claims.

For a fuller understanding of the nature and objects of the invention, reference should be had to the following detailed description, taken in connection with the accompanying drawings, in which the same reference numerals designate like or corresponding parts of the several views, and in which FIG. 1 is a top view of the turret assembly of this invention;

FIG. 2 is an end view of FIG. 1;

FIG. 3 is a sectional view taken along line 3—3 of FIG. 1;

Figure 4:
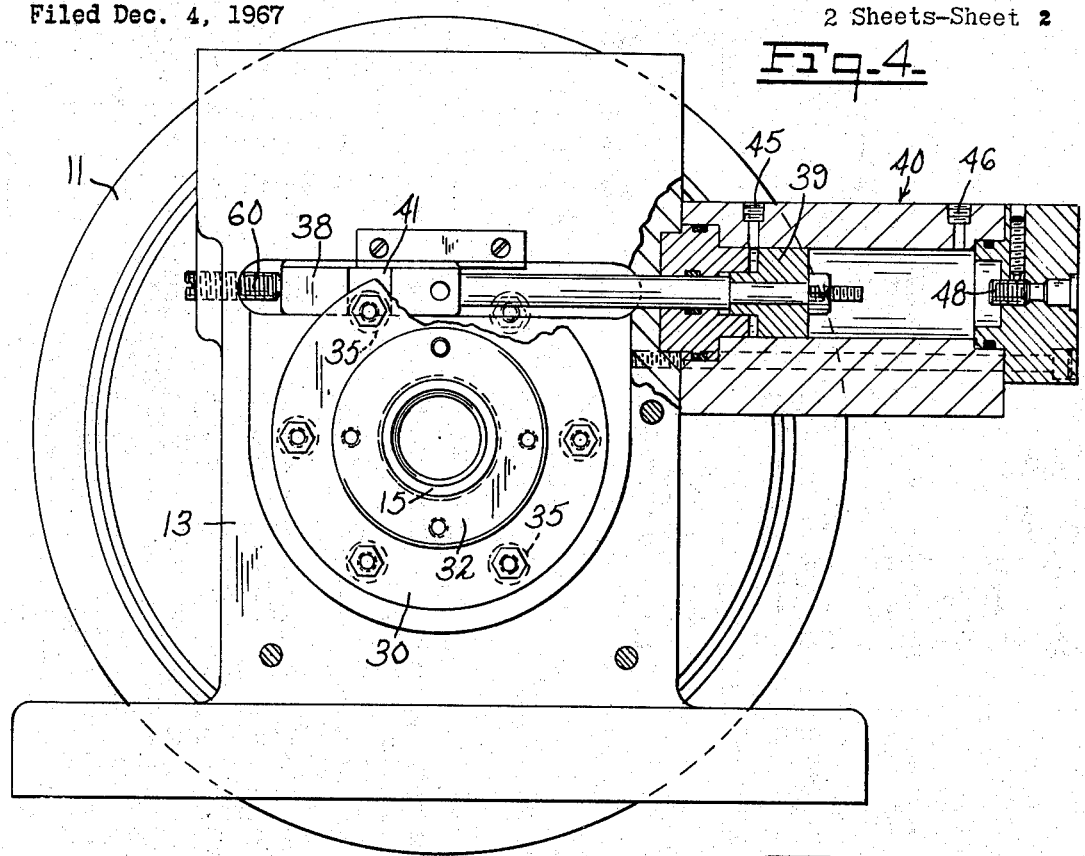
FIG. 4 is an end view of FIG. 1, partially in section.

Referring to FIGS. 1–4, a turret assembly is shown at 10 which comprises a tool holder 11 having a plurality of tool holder positions thereabout, shown at 12. In the preferred embodiment, six tool holder positions are shown. The tools are held by the tool holder in a conventional manner. The tool holder 11 is positioned on a base 13 and is keyed at 14 to a shaft 15 which shaft is rotatable within the base 13. The base 13 and the tool holder 11 are constructed with mating portions of a tooth-type face coupling shown at 16 and 17, respectively, such that when the base and the tool holder are clamped together the parts mesh on tapered tooth flanks and, for all practical purposes, become one unitary part. When the number of teeth selected is a sum multiple of the number of tool positions, the tool holder can be maneuvered with respect to the base such that any tool can be put in the proper working position which will be consistent, rigid and repeatable.

In order to provide means for clamping and unclamping the tool holder turret, there is provided a hydraulic cylinder generally shown at 20, which includes a piston 21 and a member 22 forming the upper portion of the cylinder 20, the lower portion of the cylinder 20 being provided by the base 13. The piston member 21 has a portion thereof shown at 23 which engages a portion of the tool holder 11 to raise it, such that the mating two surfaces 16 and 17 may be separated. This is accomplished by providing fluid intake and outlet means 25 and 26, respectively. A suitable source of fluid and a valve assembly (not shown) and well known in the prior art, may be used for permitting fluid to enter the cylinder 20 to cause the piston 21 to be lowered or raised.

In order to effect rotation, a disc 30 is provided which is keyed at 31 to the shaft 15. The disc is held in place by a nut 32 which is threadedly secured to the shaft 15. On this disc there is provided a plurality of rollers 35 (six in the preferred embodiment, corresponding to the six tool holder positions) which are caused to rotate by means of a cross head slide shown at 38.

Referring particularly now to FIG. 4, the cross head slide 38 is shown coupled to the piston 39 of a hydraulic cylinder generally shown at 40, this cylinder being supported from the base 13. The slide 38 is provided with a slot 41 which is of a dimension to surround a portion of the rollers 35. Fluid is provided to the cylinder 40 through inlet and outlet means 45 and 46, respectively. The fluid entering or leaving the cylinder 40 may be controlled by the use of a standard valve assembly, well known in the prior art. A rearward stop is provided at 48 in the hydraulic cylinder to limit the backward motion of the slide 38, the amount and degree of forward motion being controlled by a mechanical stop provided at 60.

Figure 5:
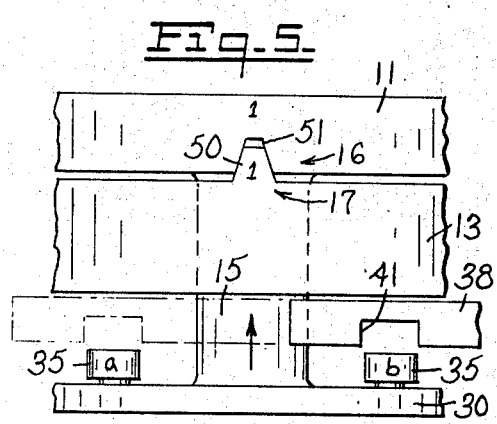
FIGS. 5, 6 and 7 are diagrammatic views of a portion of the indexing mechanism showing the position of the parts of the mechanism during various stages of the indexing procedure.
Figure 6:
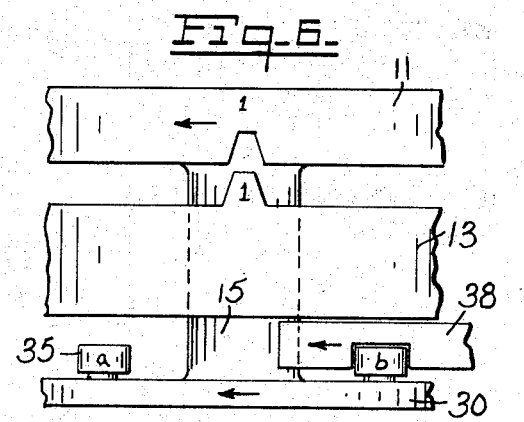
Figure 7:
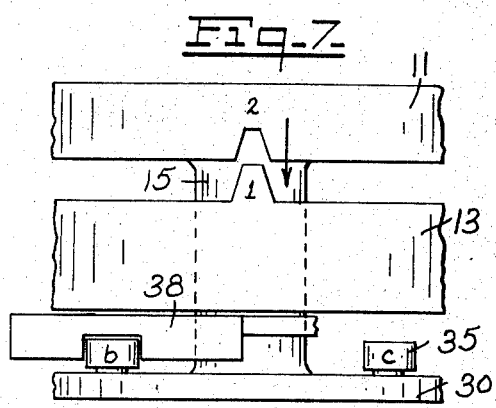

In order to describe the operation of the tool turret indexing mechanism of this invention, reference should now be had to FIGS. 5-7 which show the operating sequence of the system. FIG. 5 shows the position of the mating couplings 16 and 17 wherein a tooth generally shown at 50 is positioned within a recess 51. The cross head slide is shown at 38 and the slot at 41. Additionally, the disc 30 is diagrammatically shown as well as the shaft 15 to which it is coupled. In FIG. 5 the parts are shown positioned such that the turret tool holder is coupled to the base so that all are acting as a single, unitary body.

In FIG. 6 there is shown the effect of causing fluid to enter the cylinder 20 to cause the piston 21 to move upwardly to separate the coupling 16 and 17. By moving the piston 21 upwardly, the disc moves upwardly at the same time, such that one of the rollers shown as $b$ on the disc 30 enters the slot 41 of the slide member 38. Thus, even while the coupling members are separated, the tool holder is, at all times, prevented from rotating about the base and so prevents movement of the tool holder with respect to the base in an uncontrolled manner. This prevents uncalled-for rotation which could result in the device getting out of proper sequence.

Thereafter, to rotate the tool holder, the cross head slide 38 is moved to the left, as shown in FIG. 6, to cause the shaft to move in a clockwise direction. On completion of the movement of the disc 30 by the slide 38 as shown in FIG. 7, the piston 21 (shown in FIG. 3 along with coupling 16) is caused to move downwardly by the exhausting of fluid from the cylinder 20, such that the tooth shown at 1 will now mesh with a corresponding mating recess shown at 2 in the drawing.

It should be understood that the principles herein can also be utilized to move the turret tool holder in a counterclockwise direction if desired. The system herein thus provides for the rotating of the tool holder in a step-by-step manner and requires only clamping and unclamping to effect movement of one tool holder position to the next.

After the members are in a position, as shown in FIG. 7, they will then (due to the movement of piston 21) be in the position as shown in FIG. 5.

As shown in these drawings, the cross head slide is moved by the entrance and exit of fluid into the cylinder shown at 40, in a manner to cause the slide to move to the left or right, as desired.

It will thus be seen that the objects set forth above, among those made apparent from the preceding description, are efficiently attained and, since certain changes may be made in carrying-out the above construction without departing from the spirit and scope of the invention, it is intended that all matter contained in the foregoing description and shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:
1. A turret indexing mechanism comprising a base, a tool holder having means for receiving a plurality of tools thereon, coupling means on said tool holder and said base arranged to lock said base and said tool holder in a stationary position relative to each other, hydraulic cylinder and piston means carried by said base and arranged to move said tool holder to disengage said coupling means, a stem member affixed to said tool holder, a disc member fixedly mounted on said stem member, a plurality of roller members positioned on said disc member whose positions correspond to definite positions of said tool holder, and cross slide means having a recess therein for receiving said roller members when said coupling means is unclamped so that, upon movement of said slide means said tool holder is moved to a new position relative to said base, and such that when said coupling means is locked said roller member passes out of said recess.

2. A turrent indexing mechanism in accordance with claim 1, wherein said coupling means comprises tooth-type means supported on one of said base and tool holder and tooth-type receiving means supported on the other of said base and tool holder which can lock to prevent said tool holder from rotating relative to said base.

3. A turret mechanism in accordance with claim 1, wherein said tool holder has means for receiving six tools on the circumference thereof and wherein six roller members are positioned on said disc member, such that the position of each roller member corresponds to the position of an individual tool holding means on said tool holder.

References Cited
UNITED STATES PATENTS

| | | | |
|---|---|---|---|
| 2,924,127 | 2/1960 | Johnson | 74—822 |
| 2,952,169 | 9/1960 | Johnson | 82—36X |
| 3,242,771 | 3/1966 | Maier et al. | 74—826 |

LEONIDAS VLACHOS, Primary Examiner

U.S. Cl. X.R.

74—826